United States Patent
Fukasawa et al.

(10) Patent No.: US 12,438,443 B2
(45) Date of Patent: Oct. 7, 2025

(54) CONTROLLER FOR POWER CONVERSION SYSTEM

(71) Applicant: TMEIC Corporation, Chuo-ku (JP)

(72) Inventors: Issei Fukasawa, Tokyo (JP); Masahiro Kinoshita, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 191 days.

(21) Appl. No.: 17/754,463

(22) PCT Filed: Dec. 10, 2019

(86) PCT No.: PCT/JP2019/048236
§ 371 (c)(1),
(2) Date: Apr. 1, 2022

(87) PCT Pub. No.: WO2021/117124
PCT Pub. Date: Jun. 17, 2021

(65) Prior Publication Data
US 2022/0385171 A1 Dec. 1, 2022

(51) Int. Cl.
*H02M 1/32* (2007.01)
*H02J 3/38* (2006.01)

(52) U.S. Cl.
CPC ............ *H02M 1/327* (2021.05); *H02J 3/381* (2013.01); *H02J 2300/24* (2020.01)

(58) Field of Classification Search
CPC ....... H02M 1/327; H02J 3/381; H02J 2300/24
See application file for complete search history.

(56) References Cited

U.S. PATENT DOCUMENTS

| | | | |
|---|---|---|---|
| 2010/0188869 A1* | 7/2010 | Fredette | H02M 1/10 363/15 |
| 2011/0169344 A1* | 7/2011 | Suekane | H02J 3/381 307/151 |

(Continued)

FOREIGN PATENT DOCUMENTS

| | | |
|---|---|---|
| JP | 7-79573 A | 3/1995 |
| JP | 9-28040 A | 1/1997 |

(Continued)

OTHER PUBLICATIONS

International Search Report and Written Opinion mailed on Feb. 10, 2020 in PCT/JP2019/048236 filed on Dec. 10, 2019 (total 15 pages).

(Continued)

*Primary Examiner* — Peter M Novak
(74) *Attorney, Agent, or Firm* — Oblon, McClelland, Maier & Neustadt, L.L.P.

(57) ABSTRACT

A controller for a power conversion system includes a determination unit configured to determine whether a current time is in nighttime in an environment of a power converter that is connected to one or both of a direct-current power supply and an alternating-current power supply, and a control unit configured, in a case that the determination unit determines that the current time is in the nighttime, to maintain a switch in a closed state, the switch being provided between the power converter and one of the alternating-current power supply and the direct-current power supply, and to maintain power consumption by a resistor provided in a main circuit inside a housing of the power converter. The power conversion system can suppress lowering of temperature inside a housing without separately including a space heater.

3 Claims, 2 Drawing Sheets

(56) References Cited

U.S. PATENT DOCUMENTS

| | | | | |
|---|---|---|---|---|
| 2011/0216562 A1* | 9/2011 | Gengenbach | ......... | H02M 1/126 363/71 |
| 2013/0088080 A1* | 4/2013 | Smith | ................... | H02M 1/126 307/43 |
| 2013/0249397 A1* | 9/2013 | Chandran | ............ | H05B 47/185 315/85 |
| 2015/0103574 A1* | 4/2015 | Hintz | ...................... | H02J 7/345 363/132 |
| 2018/0006463 A1* | 1/2018 | Bintz, II | ................ | H02J 3/381 |

FOREIGN PATENT DOCUMENTS

| | | | |
|---|---|---|---|
| JP | 2001-37293 A | 2/2001 | |
| JP | 2011-217429 A | 10/2011 | |
| JP | 2017-103973 A | 6/2017 | |
| WO | WO 2017/043197 A1 | 3/2017 | |
| WO | WO 2018/047415 A1 | 3/2018 | |

OTHER PUBLICATIONS

International Preliminary Report on Patentability and Written Opinion mailed on Jun. 23, 2022 in PCT/JP2019/048236 (submitting English translation only), 8 pages.

Indian Office Action issued Nov. 21, 2023 in Indian Patent Application No. 202217020004, 2 pages.

Indian Office Action issued Aug. 12, 2022 in Indian Patent Application No. 202217020004, 5 pages.

Office Action dated Jun. 26, 2025, issued in counterpart CN Application No. 201980101092.3, with English machine translation. (16 pages).

* cited by examiner

CONTROLLER FOR POWER CONVERSION SYSTEM

FIELD

The present invention relates to a controller for a power conversion system.

BACKGROUND

PTL 1 discloses a power conversion system. The power conversion system can cooperate with a system while suppressing a rush current.

CITATION LIST

Patent Literature

[PTL 1] JP H9-28040 A

SUMMARY

Technical Problem

In the power conversion system disclosed in PTL 1, however, a power converter stops operation while a solar power generation facility does not generate power in the nighttime. Accordingly, a main circuit of the power converter is disconnected from the solar power generation facility and an alternating-current power supply. To suppress lowering of temperature inside a housing of the power converter in this state, heating by a space heater is necessary.

The present invention is made to solve the above-described issues. An object of the present invention is to provide a controller for a power conversion system that can suppress lowering of temperature inside a housing without separately including a space heater.

Solution to Problem

A controller for a power conversion system according to the present invention includes a determination unit configured to determine whether a current time is in nighttime in an environment of a power converter that is connected to one or both of a direct-current power supply and an alternating-current power supply, and a control unit configured, in a case where the determination unit determines that the current time is in the nighttime, to maintain a switch in a closed state, the switch being provided between the power converter and one of the alternating-current power supply and the direct-current power supply, and to maintain power consumption by a resistor provided in a main circuit inside a housing of the power converter.

A controller for a power conversion system according to the present invention includes a determination unit configured to determine whether a current time is in nighttime in an environment of a power converter that is connected between a direct-current power supply and an alternating-current power supply, and a control unit configured, in a case where the determination unit determines that the current time is in the nighttime, to maintain an alternating-current switch in a closed state, the switch being provided between the power converter and one of the alternating-current power supply and the direct-current power supply, and to maintain power consumption by the power converter by operating the power converter.

Advantageous Effects of Invention

According to the present invention, in the case where it is determined that the current time is in the nighttime, the controller maintains the alternating-current switch in the closed state. Accordingly, the power from the alternating-current power supply is consumed. As a result, it is possible to suppress lowering of the temperature inside the housing without separately including the space heater.

DESCRIPTION OF EMBODIMENT

Figure 1:
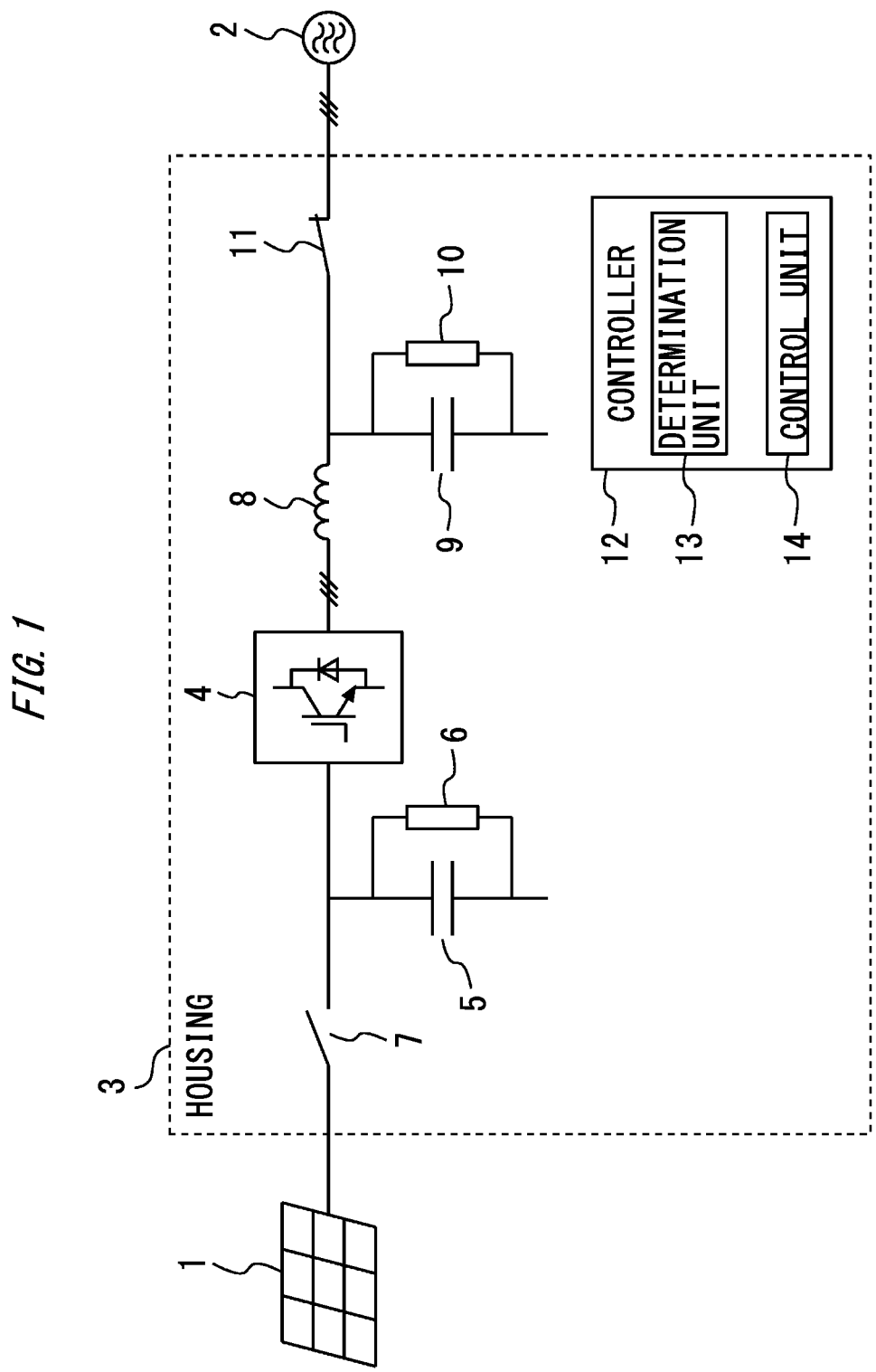
FIG. 1 is a diagram illustrating a configuration of a power system to which a controller for a power conversion system according to Embodiment 1 is applied.

An embodiment of the present invention is described with reference to accompanying drawings. Note that, in the drawings, the same or equivalent components are denoted by the same reference numerals. Repetitive description of such components is appropriately simplified or omitted.

Embodiment 1

FIG. 1 is a diagram illustrating a configuration of a power system to which a controller for a power conversion system according to Embodiment 1 is applied.

In FIG. 1, a direct-current power supply 1 is a solar cell. An alternating-current power supply 2 is a three-phase power supply and is operated by an electric power company or the like.

The power conversion system includes a housing 3, a power converter 4, a direct-current capacitor 5, a direct-current discharge resistor 6, a direct-current switch 7, an alternating-current reactor 8, an alternating-current capacitor 9, an alternating-current discharge resistor 10, an alternating-current switch 11, and a controller 12.

The housing 3 forms an outer shell of the power conversion system. The power converter 4 is connected between the direct-current power supply 1 and the alternating-current power supply 2. The direct-current capacitor 5 is connected between the direct-current power supply 1 and the power converter 4. The direct-current discharge resistor 6 is connected in parallel with the direct-current capacitor 5. The direct-current switch 7 is connected between the direct-current power supply 1 and the direct-current capacitor 5. The alternating-current reactor 8 is connected between the alternating-current power supply 2 and the power converter 4. The alternating-current capacitor 9 is connected between the alternating-current power supply 2 and the alternating-current reactor 8. The alternating-current discharge resistor 10 is connected in parallel with the alternating-current capacitor 9. The alternating-current switch 11 is connected between the alternating-current power supply 2 and the alternating-current capacitor 9.

The controller 12 includes a determination unit 13 and a control unit 14.

The determination unit 13 determines whether a current time is in the nighttime. For example, the determination unit 13 determines whether the current time is in the nighttime based on at least one of power, a voltage, and a current on an output side of the direct-current power supply 1 that is a solar cell. For example, the determination unit 13 determines whether the current time is in the nighttime by using a timer. For example, the determination unit 13 determines whether the current time is in the nighttime based on information from outside.

The control unit 14 controls the power converter 4, the direct-current switch 7, and the alternating-current switch 11 based on a result of the determination by the determination unit 13. For example, in a case where the determination unit 13 determines that the current time is in the nighttime, the control unit 14 stops the operation of the power converter 4, and then maintains the direct-current switch 7 in an opened state and maintains the alternating-current switch 11 in a closed state.

At this time, the direct-current discharge resistor 6 and the alternating-current discharge resistor 10 consume power from the alternating-current power supply 2. As a result, the direct-current discharge resistor 6 and the alternating-current discharge resistor 10 generate heat.

According to Embodiment 1 described above, in the case where it is determined that the current time is in the nighttime, the controller 12 maintains the alternating-current switch 11 in the closed state, and maintains power consumption by the direct-current discharge resistor 6 and the alternating-current discharge resistor 10 that are provided in a main circuit inside the housing 3 of the power converter 4. Accordingly, it is possible to suppress lowering of temperature inside the housing 3 without separately including a space heater. As a result, it is possible to prevent generation of dew condensation and to prevent the temperature inside the housing 3 from becoming lower than operating temperature of the components of the power conversion system.

Since the space heater is unnecessary, it is possible to simplify the configuration of the power conversion system. As a result, the cost of the power conversion system can be reduced.

Further, in the case where it is determined that the current time is in the nighttime, the controller 12 may maintain the alternating-current switch 11 in the closed state, and may operate the power converter 4 to cancel reactive power flowing out from the alternating-current capacitor 9 to the alternating-current power supply 2. In this case, heat is generated by power conversion loss of the power converter. Further, maintaining the alternating-current switch 11 in the closed state makes it possible to suppress the reactive power flowing out from the alternating-current capacitor to the alternating-current power supply 2. In this case, it is also possible to suppress lowering of the temperature inside the housing 3 without separately including the space heater.

Further, the current may be maintained at zero while the power converter 4 is operated. In this case, heat is also generated by power conversion loss of the power converter. In this case, it is also possible to suppress lowering of the temperature inside the housing 3 without separately including the space heater.

Further, the controller 15 according to Embodiment 1 may be applied to a power system that uses an electric storage facility as the direct-current power supply 1. In this case, the direct-current switch 7 is maintained in the closed state in place of the alternating-current switch 11, and no-load operation of the power converter is performed. In this case, the heat is also generated by power conversion loss of the power converter. In this case, it is also possible to suppress lowering of the temperature inside the housing 3 without separately including the space heater.

Alternatively, the controller may notice the temperature inside the housing, and the alternating-current switch 11 or the direct-current switch 7 may be closed in the nighttime only in a case where the temperature becomes lower than a threshold.

Next, an example of the controller 12 will be described with reference to FIG. 2.

Figure 2:
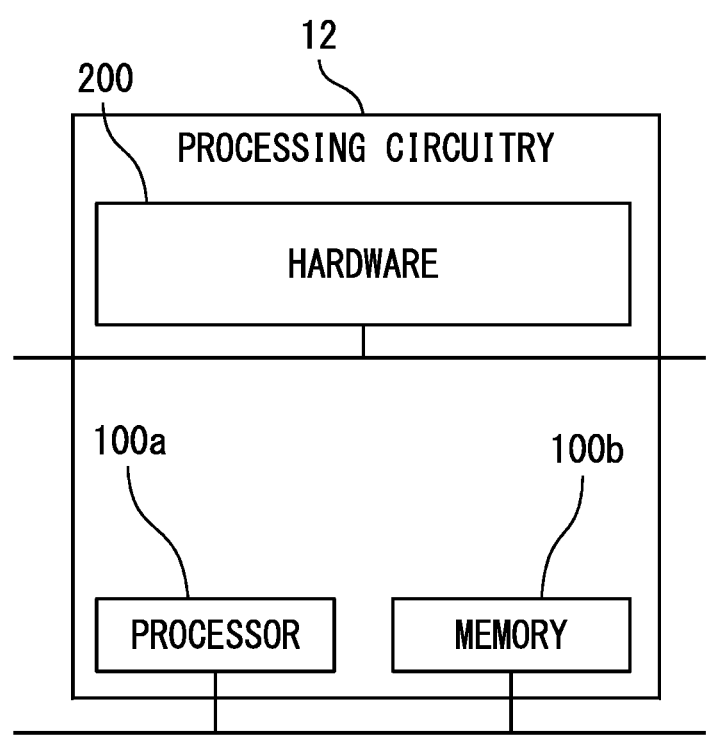
FIG. 2 is a diagram illustrating a hardware configuration of the controller for the power conversion system according to Embodiment 1.

FIG. 2 is a diagram illustrating a hardware configuration of the controller for the power conversion system according to Embodiment 1.

Each of the functions of the controller 12 can be realized by a processing circuitry. For example, the processing circuitry includes at least one processor 100a and at least one memory 100b. For example, the processing circuitry includes at least one dedicated hardware 200.

In a case where the processing circuitry includes the at least one processor 100a and at least one memory 100b, each of the functions of the controller 12 is realized by software, firmware, or a combination of software and firmware. At least one of the software and the firmware is described as a program. At least one of the software and the firmware is stored in at least one memory 100b. The at least one processor 100a reads out and executes a program stored in at least one memory 100b, thereby realizing each of the functions of the controller 12. The at least one processor 100a is also referred to as a central processing unit, a processing unit, a calculation unit, a microprocessor, a microcomputer, or a DSP. Examples of at least one memory 100b include a nonvolatile or volatile semiconductor memory such as a RAM, a ROM, a flash memory, an EPROM, and an EEPROM, a magnetic disk, a flexible disk, an optical disk, a compact disk, a mini disk, and a DVD.

In a case where the processing circuitry includes at least one dedicated hardware 200, the processing circuitry is realized by, for example, a single circuit, a composite circuit, a programmed processor, a parallel-programmed processor, an ASIC, an FPGA, or a combination thereof. For example, the functions of the controller 12 are each realized by the processing circuitry. For example, the functions of the controller 12 are collectively realized by the processing circuitry.

A part of the functions of the controller 12 may be realized by the dedicated hardware 200, and the other functions may be realized by software or firmware. For example, the function of the determination unit 13 may be realized by a processing circuitry as the dedicated hardware 200, and the functions other than the function of the determination unit 13 may be realized when the at least one processor 100a reads out and executes a program stored in at least one memory 100b.

As described above, the processing circuitry realizes the functions of the controller 12 by the hardware 200, software, firmware, or a combination thereof.

INDUSTRIAL APPLICABILITY

As described above, the controller for the power conversion system according to the present invention can be used in a system that suppresses lowering of the temperature inside the housing of the power conversion system.

REFERENCE SIGNS LIST

1 Direct-current power supply
2 Alternating-current power supply
3 Housing
4 Power converter
5 Direct-current capacitor
6 Direct-current discharge resistor 7 Direct-current switch
8 Alternating-current reactor
9 Alternating-current capacitor
10 Alternating-current discharge resistor
11 Alternating-current switch
12 Controller
13 Determination unit
14 Control unit
100a Processor
100b Memory
200 Hardware

The invention claimed is:

1. A controller for a power conversion system, the controller comprising:
   determination circuitry configured to determine whether a current time is in nighttime in an environment of a power converter that is connected between a solar cell and an alternating-current power supply; and
   control circuitry configured, in a case that the determination circuitry determines that the current time is in the nighttime, to maintain a switch in a closed state, the switch being provided between the power converter and one of the alternating-current power supply and the solar cell, and to maintain power consumption by the power converter by operating the power converter,
   wherein the power converter includes:
      a direct-current capacitor connected between the solar cell and the power converter, and a direct-current discharge resistor connected in parallel with the direct-current capacitor, which are provided on a direct-current side, and
      an alternating-current capacitor connected between the solar cell and the power converter, and an alternating-current discharge resistor connected in parallel with the alternating-current capacitor, which are provided on an alternating-current side,
   wherein the power converter outputs reactive power so that the alternating-current capacitor cancels reactive power flowing out to a system side and generates heat by a loss of power conversion in a state where heat is generated by power consumption of the direct-current discharge resistor and the alternating-current discharge resistor by power from the alternating-current power supply in the nighttime, and
   wherein the control circuitry includes means for noticing temperature, and closes the switch provided between the power converter and one of the alternating-current power supply and the solar cell in the nighttime only when the temperature is low.

2. A controller for a power conversion system, the controller comprising:
   determination circuitry configured to determine whether a current time is in nighttime in an environment of a power converter that is connected between a solar cell and an alternating-current power supply; and
   control circuitry configured, in a case that the determination circuitry determines that the current time is in the nighttime, to maintain a switch in a closed state, the switch being provided between the power converter and one of the alternating-current power supply and the solar cell, and to maintain power consumption by the power converter by operating the power converter,
   wherein the power converter is connected to a system through a transformer, and includes:
      a direct-current capacitor connected between the solar cell and the power converter, and a direct-current discharge resistor connected in parallel with the direct-current capacitor, which are provided on a direct-current side, and
      an alternating-current capacitor connected between the solar cell and the power converter, and an alternating-current discharge resistor connected in parallel with the alternating-current capacitor, which are provided on an alternating-current side, and
   wherein the power converter outputs reactive power so that the transformer cancels reactive power flowing out to a system side and generates heat by a loss of power conversion in a state where heat is generated by power consumption of the direct-current discharge resistor and the alternating-current discharge resistor by power from the alternating-current power supply in the nighttime, and
   wherein the control circuitry includes means for noticing temperature, and closes the switch provided between the power converter and one of the alternating-current power supply and the solar cell in the nighttime only when the temperature is low.

3. A controller for a power conversion system, the controller comprising:
   determination circuitry configured to determine whether a current time is in nighttime in an environment of a power converter that is connected between a solar cell and an alternating-current power supply; and
   control circuitry configured, in a case that the determination circuitry determines that the current time is in the nighttime, to maintain a switch in a closed state, the switch being provided between the power converter and one of the alternating-current power supply and the solar cell, and to maintain power consumption by the power converter by operating the power converter,
   wherein the power converter includes:
      a direct-current capacitor connected between the solar cell and the power converter, and a direct-current discharge resistor connected in parallel with the direct-current capacitor, which are provided on a direct-current side, and
      an alternating-current capacitor connected between the solar cell and the power converter, and an alternating-current discharge resistor connected in parallel with the alternating-current capacitor, which are provided on an alternating-current side,
   wherein the controller is configured to generate heat by conversion losses of the power converter having current flow in the alternating current discharge resistor and having current flow in the direct current discharge resistor, and
   wherein the control circuitry includes a sensor for detecting temperature, and closes the switch provided between the power converter and one of the alternating-current power supply and the solar cell only when the temperature is low.

* * * * *